(12) United States Patent
Tsutsumi et al.

(10) Patent No.: US 11,374,325 B2
(45) Date of Patent: Jun. 28, 2022

(54) ANTENNA APPARATUS AND ELECTRONIC APPARATUS

(71) Applicant: KABUSHIKI KAISHA TOSHIBA, Tokyo (JP)

(72) Inventors: Yukako Tsutsumi, Kawasaki Kanagawa (JP); Makoto Higaki, Setagaya Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 8 days.

(21) Appl. No.: 17/016,581

(22) Filed: Sep. 10, 2020

(65) Prior Publication Data
US 2021/0135365 A1 May 6, 2021

(30) Foreign Application Priority Data

Oct. 30, 2019 (JP) .............................. JP2019-197869

(51) Int. Cl.
*H01Q 9/04* (2006.01)
*G01S 3/40* (2006.01)
*H04B 17/27* (2015.01)
*H01Q 3/36* (2006.01)

(52) U.S. Cl.
CPC ............. *H01Q 9/0428* (2013.01); *G01S 3/40* (2013.01); *H01Q 3/36* (2013.01); *H04B 17/27* (2015.01)

(58) Field of Classification Search
None
See application file for complete search history.

(56) References Cited

U.S. PATENT DOCUMENTS

| 9,391,375 | B1 * | 7/2016 | Bales | H01Q 21/064 |
| 9,692,141 | B2 * | 6/2017 | Orban | H01Q 19/10 |
| 2004/0233106 | A1 * | 11/2004 | Rao | H01Q 9/42 |
| | | | | 343/700 MS |

(Continued)

FOREIGN PATENT DOCUMENTS

JP 2004088325 A 3/2004

OTHER PUBLICATIONS

Zhang-Cheng Hao, Hong-Hui Wang, and Wei Hong, A Novel Planar Reconfigurable Monopulse Antenna for Indoor Smart Wireless Access Points' Application, IEEE Transactions on Antennas and Propagation, vol. 64, No. 4, Apr. 2016, pp. 1250-1261 (Year: 2016).*

*Primary Examiner* — German Viana Di Prisco
(74) *Attorney, Agent, or Firm* — Holtz, Holtz & Volek PC (57) ABSTRACT

According to one embodiment, an antenna apparatus includes at least four first to Nth circularly polarized antennas in a planar shape; and phase adjustment circuitry adjusting phase relationship between first to Nth signals of the first to Nth circularly polarized antennas. The first to Mth circularly polarized antennas and the M+1th to Nth circularly polarized antennas are arranged at positions surface-symmetrical to each other. The first to Nth circularly polarized antennas are rotated in direction at first to Nth angles with respect to a first direction parallel to the first to Nth circularly polarized antennas. The phase adjustment circuitry is configured to set phases of the first to Mth signals to first to Mth phases corresponding to the first to Mth angles, and set phases of the M+1th to Nth signals to M+1th to Nth phases added by a first value to phases corresponding to the M+1th to Nth angles.

16 Claims, 10 Drawing Sheets

(56) References Cited

U.S. PATENT DOCUMENTS

| | | | | |
|---|---|---|---|---|
| 2006/0132359 A1* | 6/2006 | Chang | H01Q 21/0075 | 343/700 MS |
| 2011/0028103 A1* | 2/2011 | Rofougaran | H01Q 9/065 | 455/77 |
| 2011/0063171 A1* | 3/2011 | Lopez | H01Q 21/296 | 343/904 |
| 2013/0201070 A1* | 8/2013 | Parsche | H01Q 13/0208 | 343/786 |
| 2016/0172757 A1* | 6/2016 | Gotti | H01Q 21/061 | 343/700 MS |
| 2018/0115076 A1* | 4/2018 | Poulson | H01Q 13/203 | |
| 2020/0028255 A1* | 1/2020 | Kuhn | H01Q 1/526 | |
| 2020/0106193 A1* | 4/2020 | Thyagarajan | H01Q 21/22 | |
| 2020/0303833 A1* | 9/2020 | Ueda | H01Q 1/2283 | |
| 2020/0335859 A1* | 10/2020 | Driscoll | H01Q 3/247 | |
| 2020/0366001 A1* | 11/2020 | Popugaev | H01Q 21/0006 | |

* cited by examiner

TIME t

FIG. 5A

TIME t'

FIG. 5B

TIME t

FIG. 6A

TIME t'

FIG. 6B

TIME t

FIG. 7A

TIME t'

① IN CASE OF ANTENNA APPARATUS ACCORDING TO FIRST EMBODIMENT
② IN CASE OF SECOND COMPARATIVE EXAMPLE
③ IN CASE OF FIRST COMPARATIVE EXAMPLE
④ IN CASE OF THIRD COMPARATIVE EXAMPLE

ANTENNA APPARATUS AND ELECTRONIC APPARATUS

CROSS REFERENCE TO RELATED APPLICATIONS

This application is based upon and claims the benefit of priority from the prior Japanese Patent Application No. 2019-197869, filed on Oct. 30, 2019, the entire contents of which are incorporated herein by reference.

FIELD

Embodiments described herein relate to an antenna apparatus and an electronic apparatus.

BACKGROUND

There is an array antenna apparatus in which patch antennas as circularly polarized antennas are concentrically arranged to provide a phase difference among the patch antennas. In the array antenna apparatus, the maximum directivity direction of the array antenna is determined based on a radius of the concentric circle while forming radiation null in a center direction of the concentric circle. The array antenna apparatus enables mobile communication with a small and simple configuration without necessity of a tracking mechanism such as a satellite.

With the configuration, however, there are issues that an axis ratio (circular polarization characteristics) around the null and broadband frequency characteristics are deteriorated.

DETAILED DESCRIPTION

According to one embodiment, an antenna apparatus includes at least four first to Nth (N≥4) circularly polarized antennas arranged in a planar shape; and phase adjustment circuitry configured to adjust phase relationship between first to Nth signals to be transmitted from the first to Nth circularly polarized antennas or between first to Nth signals received by the first to Nth circularly polarized antennas. The first to Mth (M=N/2) circularly polarized antennas and the M+1th to Nth circularly polarized antennas are arranged at positions surface-symmetrical to each other. The first to Nth circularly polarized antennas are rotated in direction at first to Nth angles with respect to a first direction parallel to the first to Nth circularly polarized antennas. The phase adjustment circuitry is configured to set phases of the first to Mth signals to first to Mth phases corresponding to the first to Mth angles, and set phases of the M+1th to Nth signals to M+1th to Nth phases added by a first value to phases corresponding to the M+1th to Nth angles.

Below, embodiments of the present invention are described with reference to drawings. In the following, identical or similar elements are denoted by identical or similar reference numerals, and the same description is appropriately omitted.

First Embodiment

Figure 1:
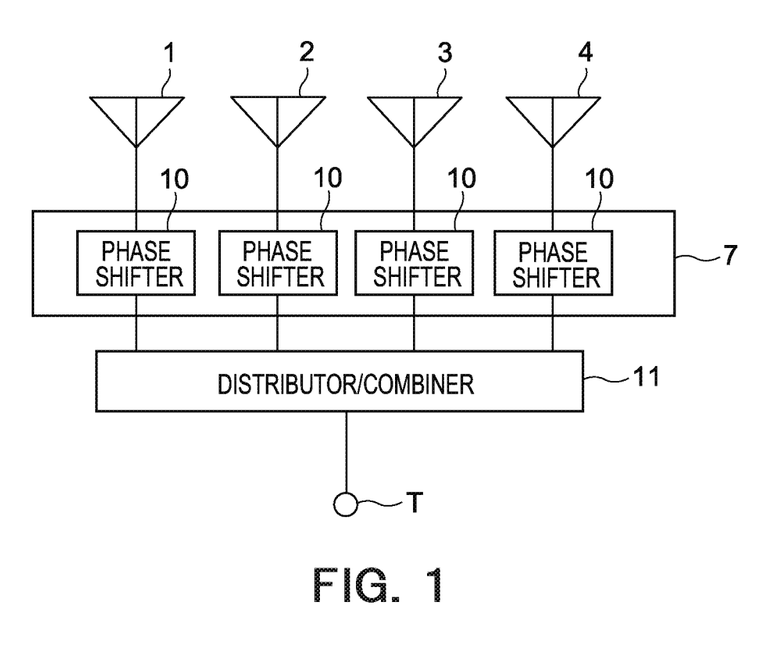
FIG. 1 is a block diagram of an antenna apparatus according to a first embodiment.

FIG. 1 illustrates a block configuration of an antenna apparatus according to a first embodiment. The antenna apparatus in FIG. 1 is configured as an array antenna apparatus including a plurality of circularly polarized antennas.

The antenna apparatus in FIG. 1 includes circularly polarized antennas 1, 2, 3, and 4, a plurality of phase shifters 10 connected to the respective circularly polarized antennas 1 to 4, and a distributor/combiner 11 (or distributing/combining circuitry). The distributor/combiner 11 includes at least one of a distributor and a combiner. The distributor divides an input signal supplied from a terminal T into four signals and supplies the four signals to the circularly polarized antennas 1 to 4. The combiner combines signals output from the circularly polarized antennas 1 to 4 and outputs a combined signal from the terminal T.

The circularly polarized antennas 1 to 4 correspond to first to fourth circularly polarized antennas or first to Nth circularly polarized antennas. As an example, the circularly polarized antennas 1 and 2 correspond to first to Mth (M is 2) circularly polarized antennas, and the circularly polarized antennas 3 and 4 correspond to M+1th to Nth (N is 4) circularly polarized antennas. M=N/2 holds. The signals supplied to the circularly polarized antennas 1 to 4 or the signals output from the circularly polarized antennas 1 to 4 correspond to first to fourth signals or first to Nth signals. The plurality of phase shifters 10 correspond to an example of phase adjustment circuitry that adjusts phase relationship of the first to fourth signals (or first to Nth signals) supplied to the circularly polarized antennas 1 to 4 or phase relationship of the first to fourth signals (first to Nth signals) received by the circularly polarized antennas 1 to 4.

The plurality of phase shifters 10 set phase differences described below to the signals supplied to the circularly polarized antennas 1 to 4 or the signals received from the circularly polarized antennas 1 to 4. The phase shifters 10 may not connected to all of the circularly polarized antennas 1 to 4 as long as the phase differences can be set. The phase shifters 10 may be connected to one or two circularly polarized antennas. The expression "phase of circularly polarized antenna" used in the following description indicates a phase of a signal supplied to a circularly polarized antenna or a phase adjusted to a signal received by the circularly polarized antenna.

Each of the phase shifters 10 includes a discrete component, an IC, a transmission line, or a combination thereof. Likewise, the distributor/combiner 11 includes a combination of a discrete component, an IC, a transmission line, and the like. Examples of each of the phase shifters 10 include a transmission line, a ferrite phase shifter, a MEMS phase shifter, and a phase shifter including a combination of a variable impedance element and a 90° hybrid coupler. Examples of the distributor/combiner 11 includes a Wilkinson distributor, a T-branch coupler, a magic Tee, a 90° hybrid coupler, and a rat-race coupler.

Figure 2:
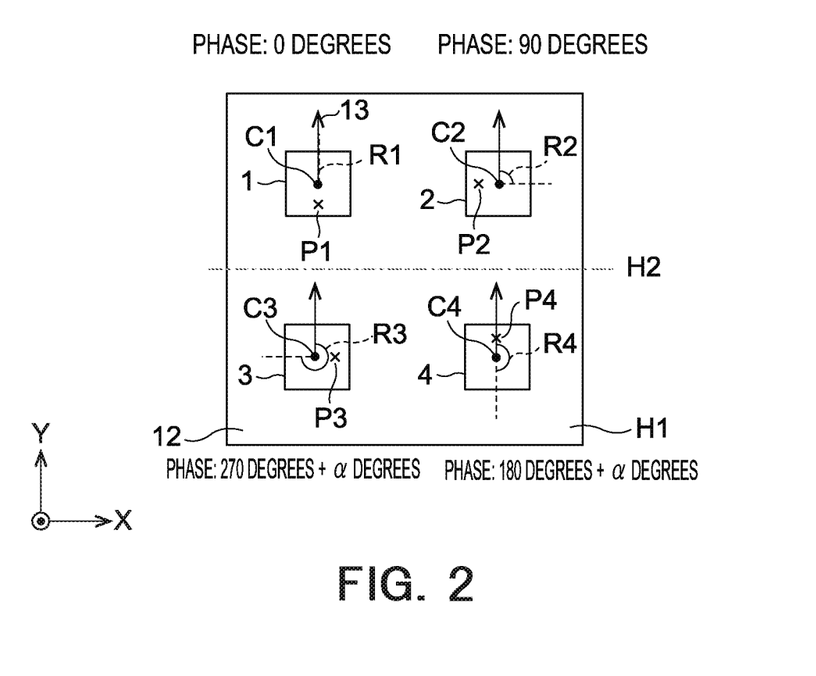
FIG. 2 is a schematic configuration diagram of a plurality of circularly polarized antennas in the antenna apparatus according to the first embodiment.

FIG. 2 is a diagram illustrating a schematic configuration of the circularly polarized antennas 1 to 4 in FIG. 1.

The circularly polarized antennas 1 to 4 are arranged in a planar shape. More specifically, the circularly polarized antennas 1 to 4 are arranged on a plane H1 of a substrate 12. In this example, the circularly polarized antennas 1 to 4 are arranged on one substrate; however, it is unnecessary to arrange the circularly polarized antennas 1 to 4 on the one substrate.

The circularly polarized antennas 1 to 4 are configured as patch antennas including feed points P1 to P4, respectively. The circularly polarized antennas 1 to 4 may be patch antennas each including two feed points, or antennas including the other configuration.

Figure 3:
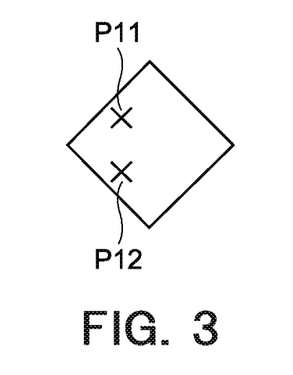
FIG. 3 is a diagram illustrating an example of a patch antenna including two feed points.

FIG. 3 illustrates an example of a patch antenna including two feed points P11 and P12.

The circularly polarized antennas 1 and 2 in FIG. 2 are arranged at positions respectively surface-symmetrical to the circularly polarized antennas 3 and 4 about a plane H2 that is orthogonal to a plane parallel to the circularly polarized antennas 1 to 4 (plane H1 or arrangement surface of circularly polarized antennas 1 to 4). The plane H2 is a symmetry plane about which the positions of the circularly polarized antennas 1 and 2 and the positions of the circularly polarized antennas 3 and 4 are symmetrical to each other.

Lines that pass through centers of the respective circularly polarized antennas 1 and 2 and are orthogonal to the plane H1 are referred to as center axes C1 and C2. Lines that pass through centers of the respective circularly polarized antennas 3 and 4 and are orthogonal to the plane H1 are referred to as center axes C3 and C4. The center axes C1 to C4 are not shafts actually present but are virtual lines for description.

A direction parallel to the plane H1 (i.e., direction parallel to circularly polarized antennas 1 to 4) is defined as a reference direction 13. An angle of the reference direction 13 is defined as 0 degrees.

The circularly polarized antenna 1 is arranged in a direction rotated by an angle (referred to as rotation angle) R1 from the reference direction 13 around the center axis C1 as a rotation axis. Likewise, the circularly polarized antenna 2 is arranged in a direction rotated by a rotation angle R2 from the reference direction 13 around the center axis C2 as a rotation axis. The circularly polarized antenna 3 is arranged in a direction rotated by a rotation angle R3 from the reference direction 13 around the center axis C3 as a rotation axis. The circularly polarized antenna 4 is arranged in a direction rotated by a rotation angle R4 from the reference direction 13 around the center axis C4 as a rotation axis. In the example of the figure, the rotation angle R1 is 0 degrees, the rotation angle R2 is 90 degrees, the rotation angle R3 is 270 degrees, and the rotation angle R4 is 180 degrees. The rotation angles R1 to R4 are different from one another.

A phase of the circularly polarized antenna 1 is a phase corresponding to the rotation angle R1. Likewise, a phase of the circularly polarized antenna 2 is a phase corresponding to the rotation angle R2. In the example of the figure, the phase of the circularly polarized antenna 1 is 0 degrees (rotation angle R1 is 0 degrees), and the phase of the circularly polarized antenna 2 is 90 degrees (rotation angle R2 is 90 degrees). In other words, in this case, the phase shifter 10 corresponding to the circularly polarized antenna 1 sets a phase (first phase) of the signal to be provided to the circularly polarized antenna 1 or the signal received by the circularly polarized antenna 1, to 0 degrees. Likewise, the phase shifter 10 corresponding to the circularly polarized antenna 2 sets a phase (second phase) of the signal to be provided to the circularly polarized antenna 2 or the signal received by the circularly polarized antenna 2, to 90 degrees. In this example, the phase and the rotation angle of each of the circularly polarized antennas 1 and 2 are coincident with each other; however, absolute values of the phase and the rotation angle of each of the circularly polarized antennas 1 and 2 may be any values as long as difference of the phase and difference of the rotation angle between the circularly polarized antennas 1 and 2 are equal to each other. For example, in a case where the rotation angle of the antenna 1 is 90 degrees and the rotation angle of the antenna 2 is 180 degree (difference of rotation angle between circularly polarized antennas 1 and 2 is 90 degrees), the phase of the circularly polarized antenna 1 may be 180 degrees and the phase of the circularly polarized antenna 2 may be 270 degrees (difference of phase between circularly polarized antennas 1 and 2 is 90 degrees), or the phase of the circularly polarized antenna 1 may be 270 degrees and the phase of the circularly polarized antenna 2 may be 360 degrees (difference of phase between circularly polarized antennas 1 and 2 is 90 degrees).

On the other hand, a phase of the circularly polarized antenna 3 is a phase obtained by adding a phase "α" that has a constant value (first value) to a phase corresponding to the rotation angle R3. A phase of the circularly polarized antenna 4 is a phase obtained by adding the phase "α" that has a constant value (first value) to a phase corresponding to the rotation angle R4. The phase "α" is the same between the circularly polarized antennas 3 and 4. In the example of the figure, the phase of the circularly polarized antenna 3 is 270+α degrees (rotation angle R3 is 270 degrees), and the phase of the circularly polarized antenna 4 is 180+α degrees (rotation angle R4 is 180 degrees). In other words, in this case, the phase shifter 10 corresponding to the circularly polarized antenna 3 sets a phase (third phase) of the signal to be provided to the circularly polarized antenna 3 or the signal received by the circularly polarized antenna 3, to a phase of 270+α degrees obtained by adding the phase "α" to the angle of 270 degrees. The phase shifter 10 corresponding to the circularly polarized antenna 4 sets a phase (fourth phase) of the signal to be provided to the circularly polarized antenna 4 or the signal received by the circularly polarized antenna 4, to a phase of 180+α degrees obtained by adding the phase "α" to the angle of 180 degrees.

The phase shifters 10 and the distributor/combiner 11 are disposed on a surface of the substrate 12, inside the substrate 12, or at a place other than the substrate 12.

Figure 4:
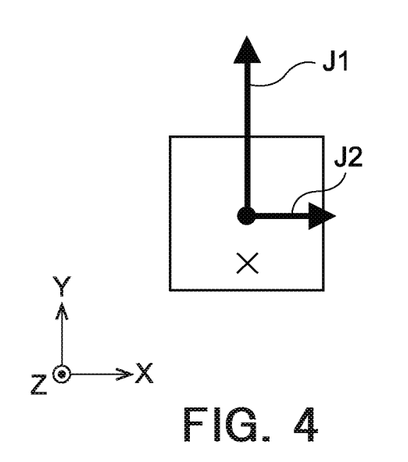
FIG. 4 is a diagram illustrating current intensity of a circularly polarized antenna.

FIG. 4 illustrates current intensity of a single circularly polarized antenna. Two orthogonal currents 31 and 32 are illustrated by arrow lines, and a longer length of a line indicates larger current intensity. A condition under which a circularly polarized wave is radiated is that amplitudes are equal to each other and the phases are shifted by 90 degrees between the two orthogonal currents. However, actually, it is difficult to adjust the amplitudes of the two orthogonal currents to be equal to each other. As illustrated in FIG. 4, for example, characteristics of the currents become unbalanced characteristics in which the amplitude of the current 32 in an X-axis direction is smaller than the amplitude of the current 31 in a Y-axis direction. In the present embodiment, even the antenna having such unbalanced characteristics (even antenna in which amplitudes of two orthogonal currents are not equal to each other at all) is referred to as a circularly polarized antenna.

Figure 5A:
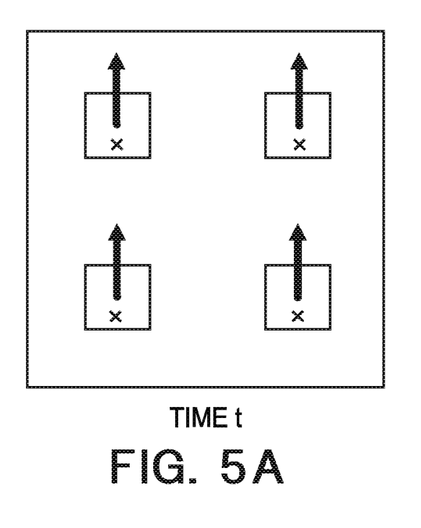
FIGS. 5A and 5B each is a diagram illustrating current intensity of an antenna configuration in which four circularly polarized antennas are arranged in the same direction and are supplied with power in phase.
Figure 5B:
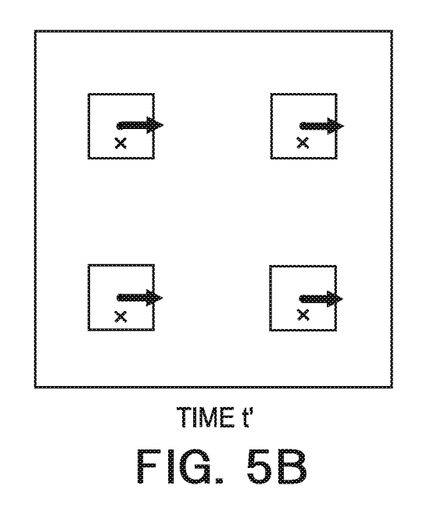

FIGS. 5A and 5B illustrate an example of current intensity in a case where four circularly polarized antennas are arranged in the same direction and are supplied with power in phase, as a first comparative example. FIG. 5A illustrates a distribution of the currents at time "t", and FIG. 5B illustrates a distribution of the currents at time "t'" after the phase advances by 90 degrees from the phase at the time "t". The intensity of a current obtained by combining the currents of the four circularly polarized antennas at the time "t" is different from the intensity of a current obtained by combining the currents of the four circularly polarized antennas at the time "t'". Therefore, the condition of the circularly polarized wave is not satisfied. Thus, the radio wave to be radiated becomes an elliptically polarized wave, and axial ratio characteristics that are indices of the circular polarization characteristics are deteriorated. The axial ratio is a ratio of the amplitudes of the two orthogonal currents. The axial ratio characteristics are excellent as the axial ratio is small.

Figure 6A:
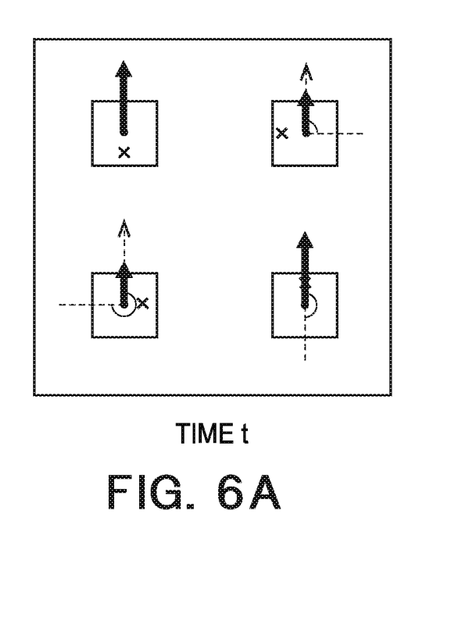
FIGS. 6A and 6B each is a diagram illustrating current intensity of a sequential array antenna.
Figure 6B:
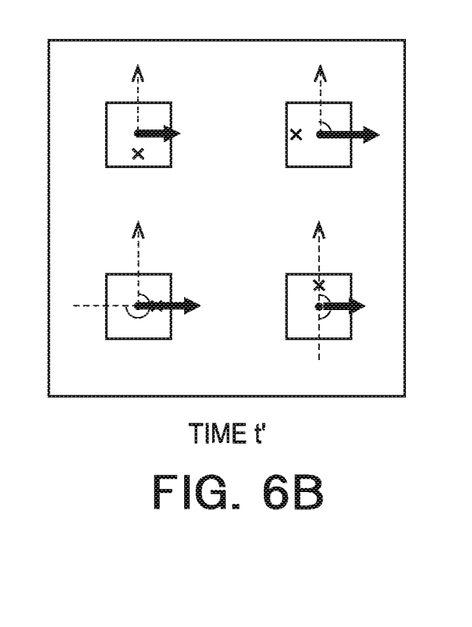

FIGS. 6A and 6B illustrate an example of current intensity in a case where a sequential array antenna is configured by four circularly polarized antennas, as a second comparative example. FIG. 6A illustrates a distribution of the currents at the time "t", and FIG. 6B illustrates a distribution of the currents at the time "t'" after the phase advances by 90 degrees from the phase at the time "t". In the sequential array antenna configured by the four circularly polarized antennas, the four circularly polarized antennas are arranged at different rotation angles to the reference direction, and signals of phases corresponding to the respective rotation angles are provided to (fed to) the four circularly polarized antennas. In the case of the sequential array antenna, the intensity of a current obtained by combining the currents of the four circularly polarized antennas at the time "t" is the same as the intensity of a current obtained by combining the currents of the four circularly polarized antennas at the time "t'". Therefore, excellent axial ratio characteristics are obtainable.

Figure 7A:
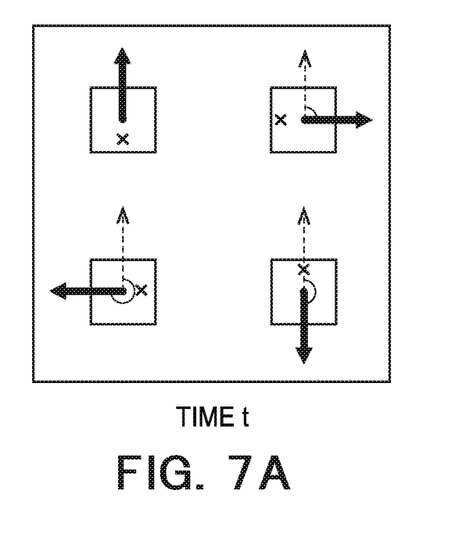
FIGS. 7A and 7B each is a diagram illustrating current intensity of an antenna in a related art.
Figure 7B:
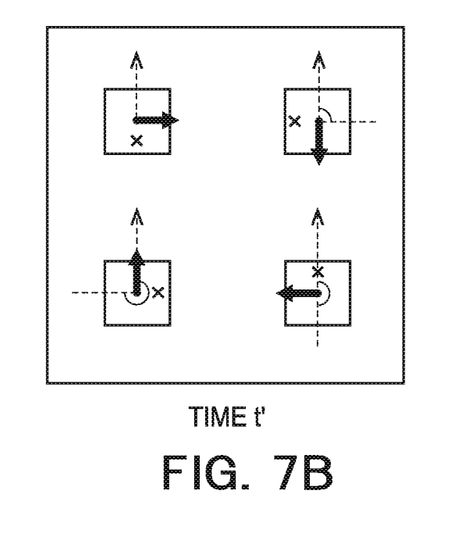

FIGS. 7A and 7B illustrates an example of current intensity in a case where four circularly polarized antennas are arranged at different rotation angles and are supplied with power in phase, as a third comparative example. FIG. 7A illustrates a distribution of the currents at the time "t", and FIG. 7B illustrates a distribution of the currents at the time "t'" after the phase advances by 90 degrees from the phase at the time "t". The currents of the four circularly polarized antennas are directed in different directions and are canceled by one another at the same time. Therefore, an effect to improve the axial ratio characteristics is small. In this configuration, a dot-shaped null is formed on a center side among the four circularly polarized antennas.

Figure 8A:
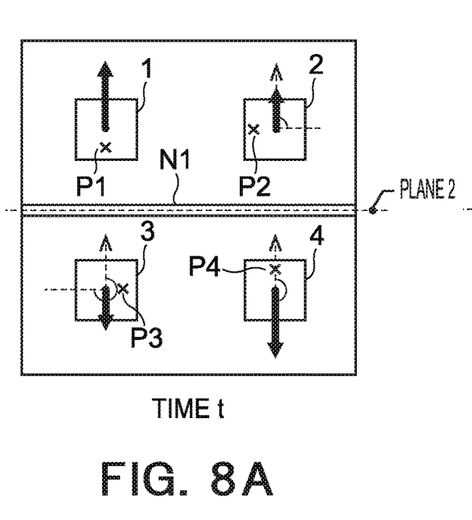
FIGS. 8A and 8B each is a diagram illustrating current intensity of the antenna apparatus according to the first embodiment.
Figure 8B:
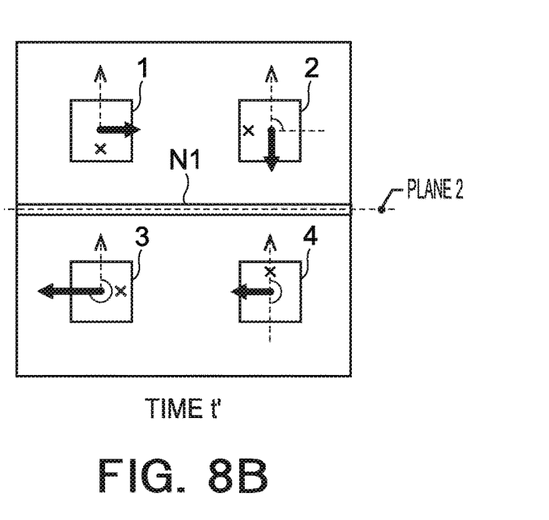

FIGS. 8A and 8B illustrate an example of the current intensity of the antenna apparatus according to the first embodiment.

The phase of the circularly polarized antenna 1 is a phase (here, 0 degrees) corresponding to the rotation angle R1, and the phase of the circularly polarized antenna 2 is a phase (here, 90 degrees) corresponding to the rotation angle R2. The phase of the circularly polarized antenna 3 is a phase obtained by adding the phase "α" to a phase (here, 270 degrees) corresponding to the rotation angle R3. The phase of the circularly polarized antenna 4 is a phase obtained by adding the phase "α" to a phase (here, 180 degrees) corresponding to the rotation angle R4. In this example, the phase "α" is 180 degrees. Accordingly, the phase of the circularly polarized antenna 3 is 270+180=90 degrees+360 degrees, and the phase of the circularly polarized antenna 4 is 180+180+360 degrees.

At the time "t", the phases of the circularly polarized antennas 1 and 2 are inverted from the phases of the circularly polarized antennas 3 and 4. Therefore, a radiation null is formed in a direction parallel to the plane H2 as the symmetry surface (in direction perpendicular to sheet surface). A null N1 is schematically illustrated. As an example, the null N1 has a linear shape as viewed from a direction that is parallel to the plane H2 and is perpendicular to the sheet surface.

Further, the circularly polarized antennas 1 and 2 have the configurations same as the configurations of the two upper antennas of the sequential array antenna in FIGS. 6A and 6B, and the circularly polarized antennas 3 and 4 also have the configurations same as the configurations of the two lower antennas of the sequential array antenna in FIGS. 6A and 6B. In other words, the intensity of the current obtained by combining the currents of the circularly polarized antennas 1 and 2 at the time "t" is the same as the intensity of the current obtained by combining the currents of the circularly polarized antennas 1 and 2 at the time "t'". Further, the intensity of the current obtained by combining the currents of the circularly polarized antennas 3 and 4 at the time "t" is the same as the intensity of the current obtained by combining the currents of the circularly polarized antennas 3 and 4 at the time "t'". Therefore, the intensity of the current obtained by combining the currents of the circularly polarized antennas 1 to 4 at the time "t" is the same as the intensity of the current obtained by combining the currents of the circularly polarized antennas 1 to at the time "t'". Accordingly, excellent axial ratio characteristics are obtainable around the null N1.

Figure 9:
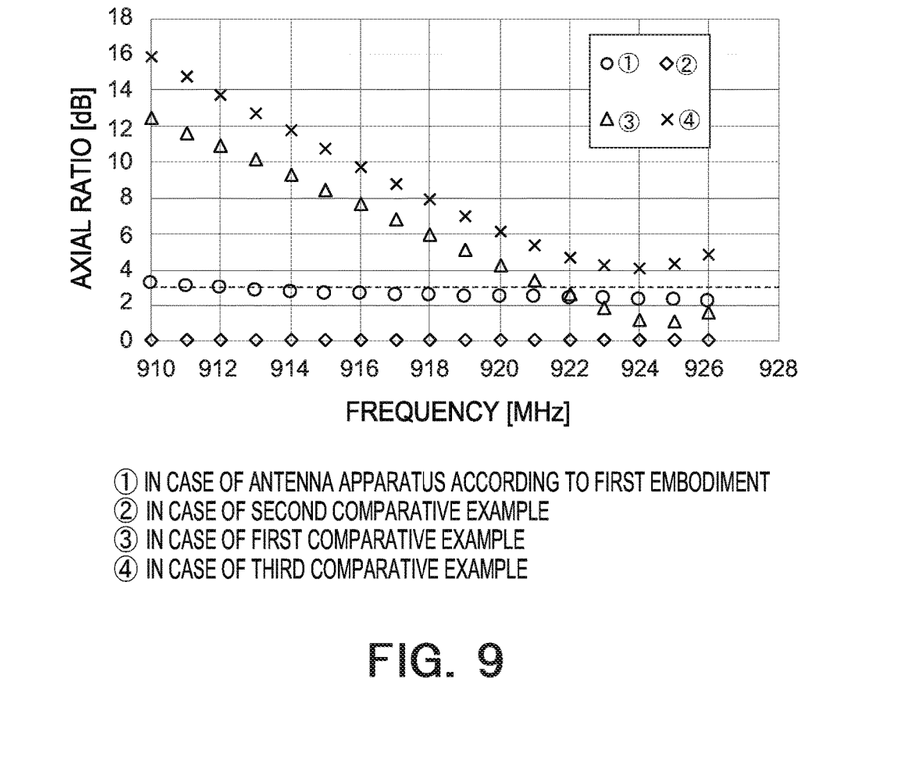
FIG. 9 is a graph illustrating simulation results of axial ratio characteristics.

FIG. 9 illustrates a graph of simulation results of the axial ratio characteristics in the case of the antenna apparatus according to the first embodiment, in the case of the first comparative example (where four circularly polarized antennas are arranged in same direction and are supplied with power in phase), in the case of the second comparative example (sequential array antenna), and in the case of the third comparative example (where four circularly polarized antennas are arranged at different rotation angles and are supplied with power in phase).

In the case of the second comparative example (sequential array antenna) and in the case of the first comparative example, the characteristics in a front direction (+Z-axis direction) are illustrated. In the case of the antenna apparatus according to the first embodiment and in the case of the third comparative example, the null is formed. Therefore, the characteristics at a position inclined by 30 degrees in the Y-axis direction from the null radiation direction (+Z-axis direction) are illustrated. In the case of the antenna apparatus according to the first embodiment, the axial ratio characteristics are inferior to the axial ratio characteristics in the second comparative example (sequential array antenna) but are excellent as compared with the first comparative example and the third comparative example. Further, in the antenna apparatus according to the first embodiment, variation of the axial ratio to a frequency is small. More specifically, the axial ratio of 3 dB or less is obtainable in a broad frequency band.

Figure 10:
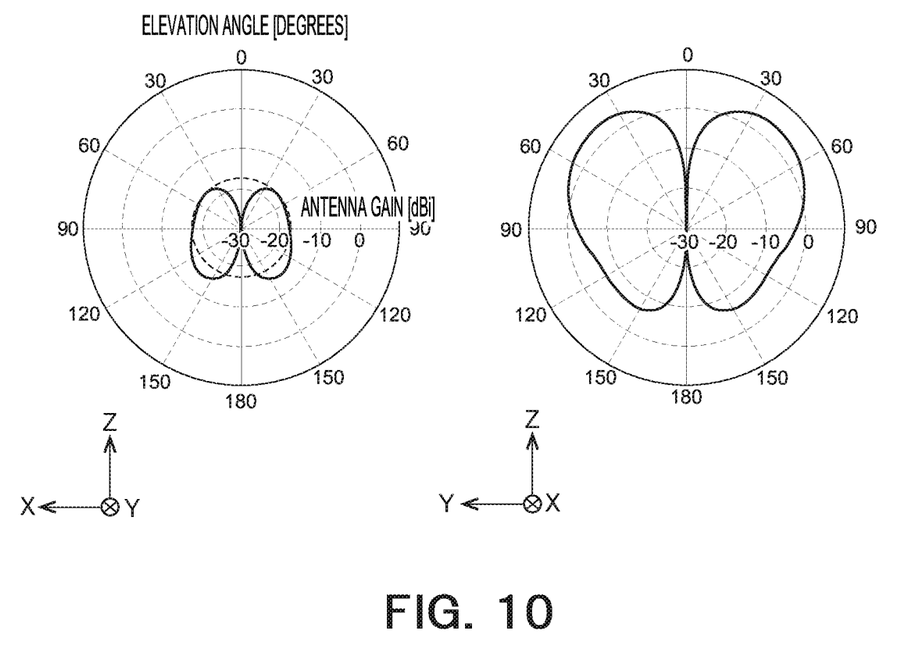
FIG. 10 is a diagram illustrating examples of a circularly polarized radiation pattern according to the first embodiment.

FIG. 10 illustrates an example of a circularly polarized radiation pattern when the phase "α" is 180 degrees in the antenna apparatus according to the first embodiment. In this example, an elevation angle is 0 degrees in the +Z direction. A left side in FIG. 10 illustrates the pattern as viewed from the Y-axis direction, and a right side in FIG. 10 illustrates the pattern as viewed from the X-axis direction. It can be confirmed that radiation null is formed in a direction along the plane H2, namely, a direction along a ZX plane.

Changing the phase "α" makes it possible to incline the direction of the null.

Figure 11:
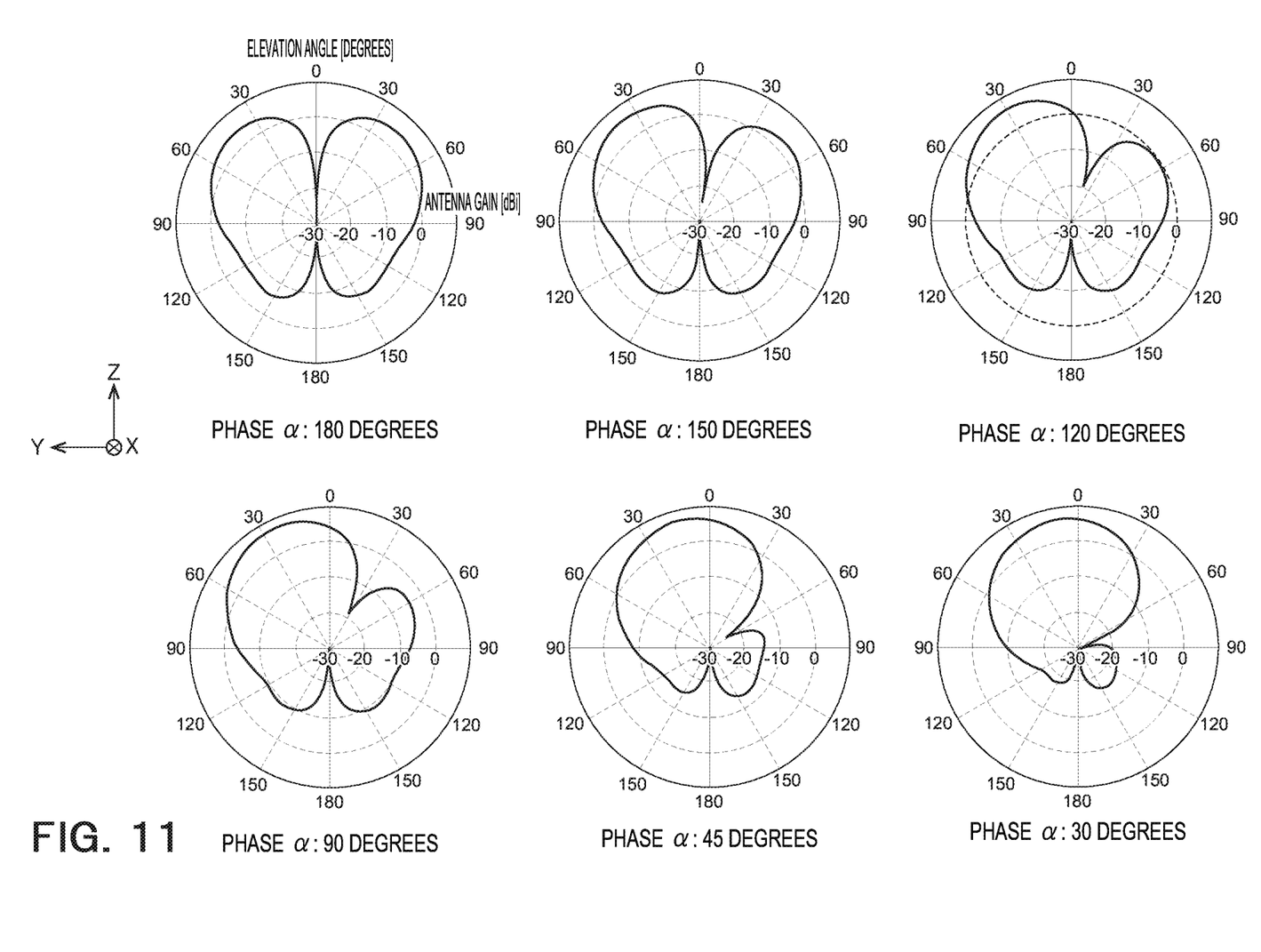
FIG. 11 is a diagram illustrating other examples of the circularly polarized radiation pattern according to the first embodiment.

FIG. 11 illustrates examples of a circularly polarized radiation pattern in a case where the phase "α" is changed from 180 degrees to 150 degrees, 120 degrees, 90 degrees, 45 degrees, and 30 degrees. The elevation angle is 0 degrees in the +Z direction. It can be confirmed that, when the phase "α" is changed from 180 degrees to 150 degrees, 120 degrees, 90 degrees, 45 degrees, and 30 degrees, the direction of the radiation null is shifted from the direction (0 degrees) along the ZX plane to 10 degrees, 20 degrees, 30 degrees, 55 degrees, and 70 degrees. As described above, the direction of the null can be changed by the set value of the phase "α" from the direction along the ZX plane to the direction inclined in the Y-axis direction. In other words, the radiation null is formed in a radial direction of a semicircle that has a diameter located on an intersection line of the plane H1 and the plane H2, and a position (direction) of the null can be optionally set. This is specifically described with reference to FIG. 12.

Figure 12:
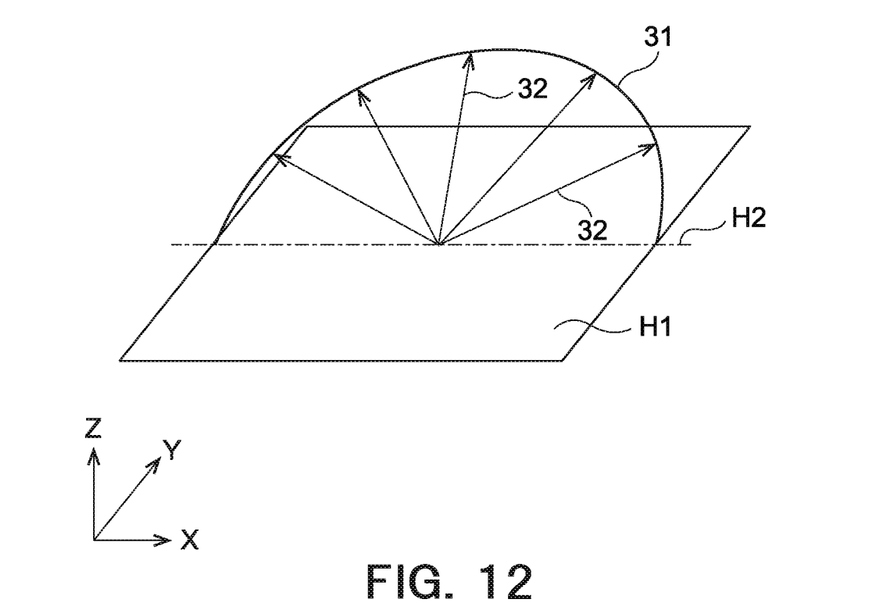
FIG. 12 is a diagram illustrating a state where a direction of a null is changed.

FIG. 12 illustrates a state of the null when the direction of the null is changed by changing the phase "α" from a state where the null is formed in the direction along the plane H2. The null is formed at a position inclined by about 60 degrees from the direction along the plane H2. The null is formed in a radial direction 32 of a semicircle 31 that has a diameter located on the intersection line of the plane H1 and the plane H2.

In FIG. 11, the example in which the phase "α" is reduced from 180 degrees to 30 degrees in a stepwise manner is illustrated. When the phase "α" is increased from 180 degrees in a stepwise manner, the direction of the radiation null is shifted in a direction opposite to the direction in FIG. 11 from the direction (0 degrees) along the ZX plane. For example, when the phase "α" is changed from 180 degrees to 210 degrees, 240 degrees, 270 degrees, 315 degrees, and 330 degrees, the direction of the radiation null is shifted to −10 degrees, −20 degrees, −30 degrees, −55 degrees, and −70 degrees.

As an example, the phase "α" is selected from a range of 90 degrees or more and 270 degrees or less based on a range of the direction in which the null is formed or the direction in which the null is to be scanned. Alternatively, as an example, the phase "α" is selected from a range of 45 degrees or more and 315 degrees or less. Alternatively, as an example, the phase "α" is selected from a range of 30 degrees or more and 330 degrees or less.

In the present embodiment, the phase shifters 10 are connected to the respective circularly polarized antennas 1 to 4; however, it is unnecessary to connect the phase shifters 10 to all of the first to fourth antennas. The phase shifters 10 may be connected to three or less antennas as long as the phases of the circularly polarized antennas 1 to 2 are settable to values corresponding to the rotation angles R1 and R2, and the phases of the circularly polarized antennas 3 and 4 are settable to values obtained by adding the phase "α" to the values corresponding to the rotation angles R3 and R4. The phase shifters 10 may not be provided, and the distributor/combiner 11 may perform operation to provide the phase difference among the antennas.

However, balance of the amplitudes is improved when the phase shifters 10 are connected to the respective first to fourth antennas because losses of the phase shifters 10 are added to the respective first to fourth antennas. Further, when the phase shifters 10 are connected to the respective first to fourth antennas, it is unnecessary to adjust the phases by the distributor/combiner 11, and the distributor/combiner 11 can be designed by regarding that the plurality of signals handled by the distributor/combiner 11 are in phase. This facilitates the design of the distributor/combiner 11.

As described above, in the antenna apparatus according to the first embodiment, the radiation null is formed in the radial direction of the semicircle that has the diameter located on the intersection line of the plane H1 and the plane H2, and the excellent axial ratio characteristics are obtainable around the null.

(Modification)

In the first embodiment, the number of circularly polarized antennas is four (i.e., N=4); however, the number of circularly polarized antennas may be an optional even number of four or more (i.e., N≥4). For example, the number of circularly polarized antennas may be six or eight. In this case, the first to Mth (M=N/2) circularly polarized antennas and the M+1th to Nth circularly polarized antennas are arranged at positions surface-symmetrical to each other.

Figure 13:
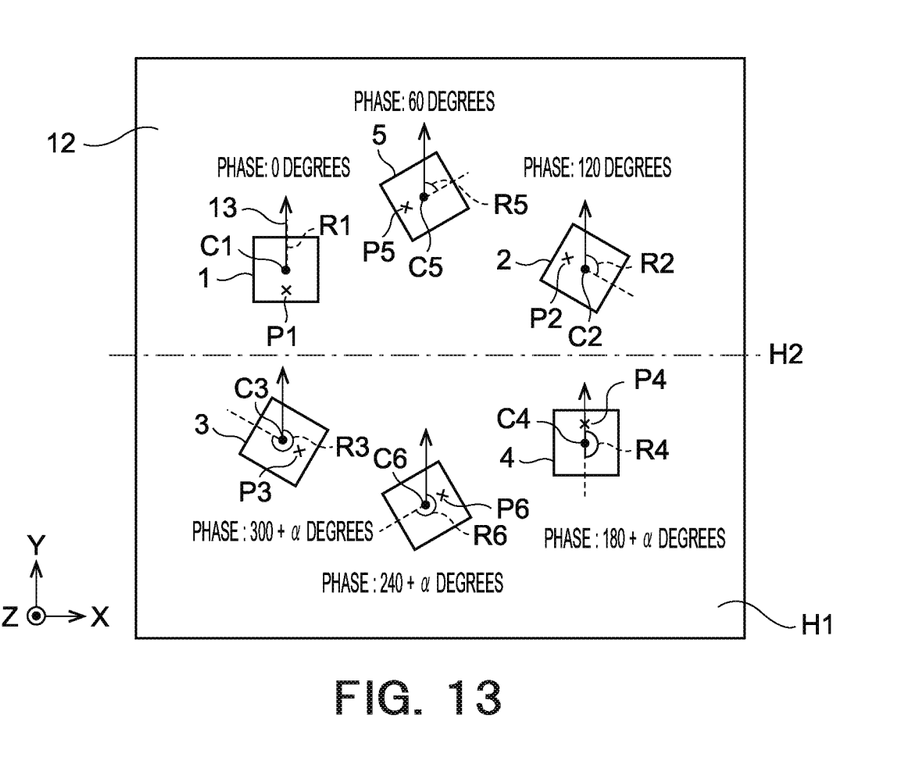
FIG. 13 is a schematic configuration diagram of a plurality of circularly polarized antennas in an antenna apparatus according to a modification.

FIG. 13 illustrates a schematic configuration of a plurality of circularly polarized antennas in an antenna apparatus according to a modification of the first embodiment. Six circularly polarized antennas 1 to 6 are arranged. The circularly polarized antennas 1, 5, and 2 are arranged at positions respectively surface-symmetrical to the circularly polarized antennas 3, 6, and 4 about the plane H2. The circularly polarized antennas 1 to 6 correspond to the first to Nth circularly polarized antennas. As an example, the circularly polarized antennas 1, 5, and 2 correspond to the first to Mth circularly polarized antennas, and the circularly polarized antennas 3, 6, and 4 correspond to the M+1th to Nth circularly polarized antennas.

The circularly polarized antennas 1, 5, and 2 are arranged in directions rotated by rotation angles R1, R5, and R2 from the reference direction 13 around center axes C1, C5, and C2 as rotation axes, respectively. The circularly polarized antennas 3, 6, and 4 are arranged in directions rotated by rotation angles R3, R6, and R4 from the reference direction 13 around center axes C3, C6, and C4 as rotation axes, respectively. In the example of the figure, the rotation angle R1 is 0 degrees, the rotation angle R5 is 60 degrees, the rotation angle R2 is 120 degrees, the rotation angle R3 is 300 degrees, the rotation angle R6 is 240 degrees, and the rotation angle R4 is 180 degrees. The rotation angles R1 to R6 are different from one another.

The phases of the circularly polarized antennas 1, 5, and 2 are phases corresponding to the rotation angles R1, R5, and R2. In the example of the figure, the phases of the circularly polarized antennas 1, 5, and 2 are respectively 0 degrees, 60 degrees, and 120 degrees.

On the other hand, the phases of the circularly polarized antennas 3, 6, and 4 are phases obtained by adding the phase "α" that has a constant value (first value) to phases corresponding to the rotation angles R3, R6, and R4. The phase "α" is the same among the circularly polarized antennas 3, 6, and 4. In the example of the figure, the phase of the circularly polarized antenna 3 is 300+α degrees, the phase of the circularly polarized antenna 6 is 240+α degrees, and the phase of the circularly polarized antenna 4 is 180+α degrees.

With this configuration, the phases of the circularly polarized antennas 1, 5, and 2 are inverted from the phases of the circularly polarized antennas 3, 6, and 4 by reasons similar to the reasons in the first embodiment. Therefore, the radiation null is formed in a direction parallel to the plane H2 as the symmetry surface (in direction perpendicular to sheet surface). Further, intensity of a current obtained by combining currents of the circularly polarized antennas 1, 5, and 2 at the time "t" is the same as intensity of a current obtained by combining the currents of the circularly polarized antennas 1, 5, and 2 at the time "t" after the phase advances by 90 degrees from the phase at the time "t". In addition, intensity of a current obtained by combining currents of the circularly polarized antennas 3, 6, and 4 at the time "t" is the same as intensity of a current obtained by combining the currents of the circularly polarized antennas 3, 6, and 4 at the time "t'". Accordingly, the excellent axial ratio characteristics are obtainable around the null.

In the present modification, the case where the number of circularly polarized antennas is six is described. This is true of a case where the number of circularly polarized antennas is an even number of eight or more.

Second Embodiment

Figure 14:
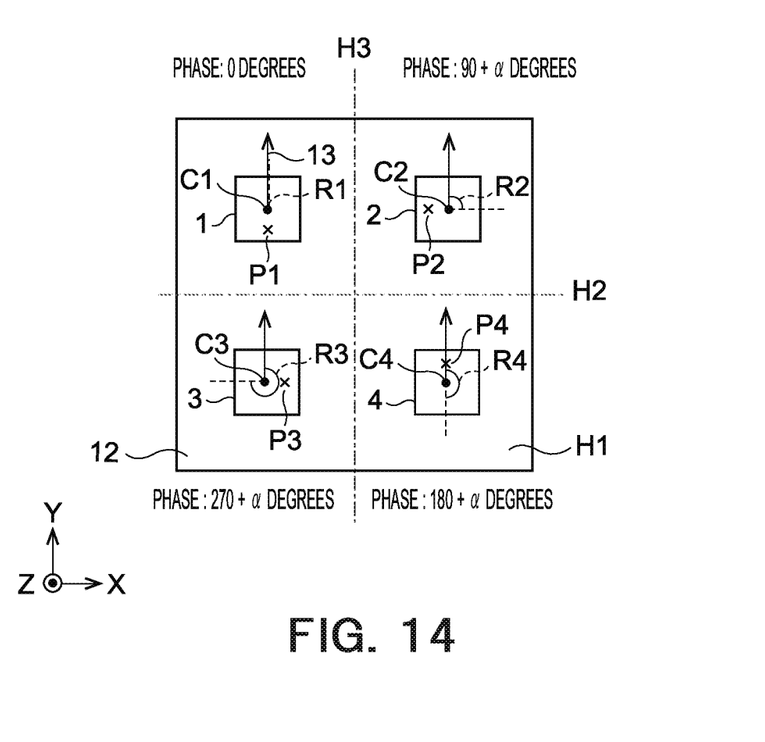
FIG. 14 is a schematic configuration diagram of a plurality of circularly polarized antennas in an antenna apparatus according to a second embodiment.

FIG. 14 illustrates a schematic configuration of circularly polarized antennas 1 to 4 in an antenna apparatus according to a second embodiment.

The circularly polarized antennas 1 and 2 and the circularly polarized antennas 3 and 4 are arranged at positions surface-symmetrical to each other about the plane H2 orthogonal to the plane H1, as well as the circularly polarized antennas 1 and 3 and the circularly polarized antennas 2 and 4 are arranged at positions surface-symmetrical to each other about a plane H3 that is orthogonal to the plane H1 and the plane H2. The plane H3 is a symmetry plane about which the positions of the circularly polarized antennas 1 and 3 and the positions of the circularly polarized antennas 2 and 4 are symmetrical to each other.

In the antenna apparatus according to the second embodiment, the phases of the circularly polarized antennas 1 and 2 are phases corresponding to the rotation angle R1 and the rotation angle R2, respectively, as with the first embodiment. In addition, the phase of the circularly polarized antenna 3 is a phase obtained by adding the phase "α" to a phase corresponding to the rotation angle R3, and the phase of the circularly polarized antenna 4 is a phase obtained by adding the phase "α" to a phase corresponding to the rotation angle R4. Such phase setting of the circularly polarized antennas 1 to 4 is referred to as a first phase mode. As a result, the radiation null is formed in the radial direction of the semicircle that has the diameter located on the intersection line of the plane H1 and the plane H2. In other words, when the intersection line of the plane H1 and the plane H2 is regarded as a first axis, the null can be formed on a plane passing through the first axis. The direction (angle) of the null can be changed by changing the value of the phase "α".

In addition, in the second embodiment, the phases of the circularly polarized antennas 1 and 3 are phases corresponding to the rotation angle R1 and the rotation angle R3, respectively. Further, the phase of the circularly polarized antenna 2 is a phase obtained by adding a phase "β" that has a constant value (second value) to the phase corresponding to the rotation angle R2, and the phase of the circularly polarized antenna 4 is a phase obtained by adding the phase "β" that has a constant value (second value) to the phase corresponding to the rotation angle R4. The phase "β" is the same between the circularly polarized antennas 2 and 4. Such phase setting of the circularly polarized antennas 1 to 4 is referred to as a second phase mode. As a result, the radiation null is formed in a radial direction of a semicircle that has a diameter located on an intersection line of the plane H1 and the plane H3. In other words, when the intersection line of the plane H1 and the plane H3 is regarded as a second axis, the null can be formed on a plane passing through the second axis. The direction (angle) of the null can be changed by changing the value of the phase "β".

The first phase mode and the second phase mode are selectively performable by setting of each of the phase shifters 10 (in case where adjustment of phases is performed by distributor/combiner 11, setting of distributor/combiner 11). When the first phase mode and the second phase mode are combined, the radiation null can be formed in a radial direction of a semicircle that has a diameter on the first axis and the second axis by the single antenna apparatus.

As described above, in the antenna apparatus according to the second embodiment, the radiation null can be formed in the radial direction of the semicircle that has the diameter on the first axis and the second axis, and excellent axial ratio characteristics are obtainable around the null.

Third Embodiment

Figure 15:
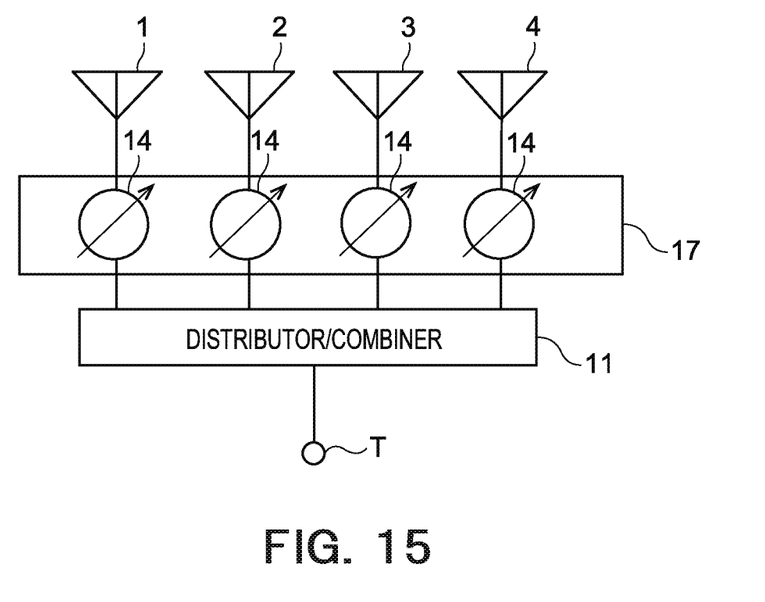
FIG. 15 is a schematic configuration diagram of an antenna apparatus according to a third embodiment.

FIG. 15 is a diagram illustrating a schematic configuration of an antenna apparatus according to a third embodiment. The configurations of the circularly polarized antennas 1 to 4 included in the antenna apparatus according to the third embodiment are similar to the configurations in FIG. 2 or FIG. 14.

The antenna apparatus in FIG. 15 is different from the antenna apparatus in FIG. 1 in that each of the phase shifters is configured of a variable phase shifter 14. Each of the variable phase shifters 14 includes a discrete component, an IC, a transmission line, or a combination thereof. Each of the variable phase shifters 14 has a configuration to vary the phase by, for example, changing an application bias.

In FIG. 15, the variable phase shifters 14 are connected to all of the circularly polarized antennas 1 to 4; however, it is unnecessary to connect the variable phase shifters 14 to all of the circularly polarized antennas 1 to 4. The variable phase shifters 14 may be connected to only one, two, or three antennas.

Use of the variable phase shifters in the above-described manner makes it possible to dynamically change the direction of the null. For example, in a case where the variable phase shifters are applied to the second embodiment, the radiation null can be independently scanned on two axes. More specifically, the phases corresponding to the rotation angles R1 to R4 are respectively set to the circularly polarized antennas 1 to 4, and the phase "α" and the phase "β" are changed.

Fourth Embodiment

Figure 16:
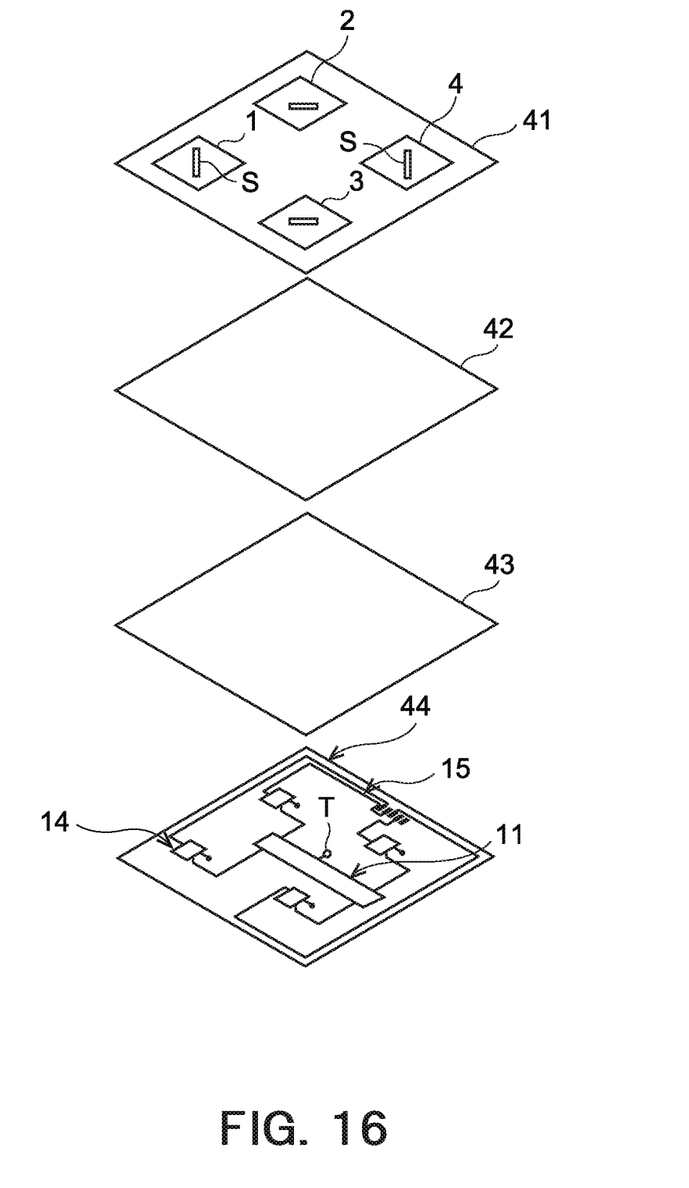
FIG. 16 is a diagram illustrating a specific configuration example of an antenna apparatus according to a fourth embodiment.

FIG. 16 illustrates a schematic configuration in a case where the circularly polarized antennas 1 to 4, the plurality of variable phase shifters 14, and the distributor/combiner 11 are formed in one substrate 12.

The circularly polarized antennas 1 to 4 are formed in a first layer 41 of the substrate 12, a first GND layer is formed in a second layer 42 of the substrate 12, a second GND layer is formed in a third layer 43 of the substrate 12, and the variable phase shifters 14 and the distributor/combiner 11 are formed in a fourth layer 44 of the substrate 12. Each of the circularly polarized antennas 1 to 4 has a configuration in which a slit is provided in a rectangular metal plate. The first GND layer in the second layer 42 serves as GND for the circularly polarized antennas 1 to 4. The second GND layer in the third layer 43 serves as GND for the variable phase shifters 14 and the distributor/combiner 11. The variable phase shifters 14 are connected to a bias line 15, and a phase shift amount of each of the variable phase shifters 14 is changeable by a bias voltage. The distributor/combiner 11 is a Wilkinson distributor, T-branch coupler, or the like. The distributor/combiner 11 includes a terminal T. The variable phase shifters 14 are connected to the circularly polarized antennas 1 to 4 through unillustrated via holes and the like. Unillustrated dielectric layers are disposed among the layers 41 to 44. The circularly polarized antennas 1 to 4, the variable phase shifters 14, and the distributor/combiner 11 are formed in the one substrate 12 in the above-described manner, which makes it possible to downsize the antenna apparatus.

Fifth Embodiment

Figure 17:
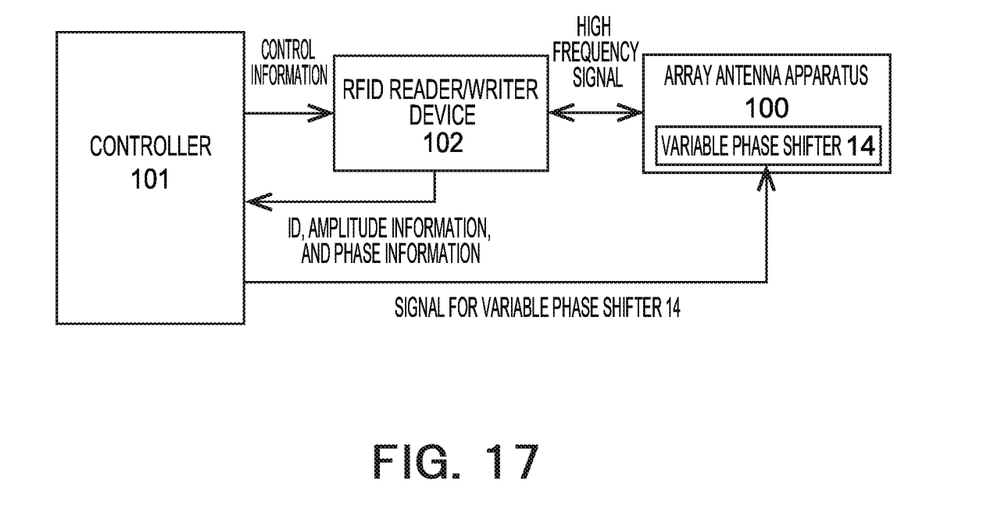
FIG. 17 is a schematic block diagram of a search apparatus according to a fifth embodiment.

FIG. 17 is a schematic block diagram of a search apparatus according to a fifth embodiment. The search apparatus in FIG. 17 includes the antenna apparatus 100 according to any of the first to fourth embodiments, controlling circuitry 101, and a reader/writer device 102 for radio frequency identification (RFID). Each of the controlling circuitry 101 and the reader/writer device 102 is configured by a dedicated circuit, an optional circuit such as a microprocessor and a central processing unit (CPU), software such as programs, or a combination thereof.

The antenna apparatus 100 has a first radiation null in the radial direction of the semicircle that has the diameter located on the first axis (intersection line of plane H1 and plane H2) on the plane H1, and a second radiation null in the radial direction of the semicircle that has the diameter located on the second axis (intersection line of plane H1 and plane H3 that is orthogonal to plane H1 and plane H2) on the plane H1. The controlling circuitry 101 rotates the direction of the first null with respect to the first axis (i.e., the first axis is used as a reference), to specify a first direction of the first null in which a search object is present, and rotates the direction of the second null with respect to the second axis (i.e., the second axis is used as a reference), to specify a second direction of the second null in which the search object is present.

More specifically, the controlling circuitry 101 supplies a phase shift voltage to the variable phase shifters 14 of the antenna apparatus 100. The controlling circuitry 101 provides control information to the reader/writer device 102. The control information instructs, for example, search of an RFID tag, readout of a tag ID from the searched RFID tag, and acquisition of amplitude information and phase information on a radio signal received from the RFID tag. The reader/writer device 102 uses the antenna apparatus 100 to scan the radiation pattern of the null, thereby searching the RFID tag. Scanning of the radiation pattern of the null is performed through change of the phase shift voltage from the controlling circuitry 101. The radiation null can be independently scanned on one axis or two axes.

The radiation pattern of the null formed by the antenna apparatus according to any of the first to fourth embodiments has angle characteristics steeper than angle characteristics of a beam formed by beam forming with the same number of antennas elements. Therefore, when the search apparatus using the antenna apparatus according to any of the first to fourth embodiments is used, the RFID tag can be accurately searched by a small device. Further, since the antenna apparatus according to any of the first to fourth embodiments has the excellent circular polarization characteristics, the antenna apparatus also has an advantage that it is unnecessary to consider a direction of the polarized wave (i.e., installation direction of antenna apparatus). In the present embodiment, the RFID tag is searched; however, the search object is not limited to the RFID tag, and may be a device mounted with a circuit communicable with the search apparatus.

The radio signal (e.g., high frequency signal) received by the antenna apparatus 100 from the RFID tag is supplied to the reader/writer device 102. The reader/writer device 102 demodulates the radio signal received by the antenna apparatus 100 to acquire an ID of the RFID tag, and acquires the amplitude information and the phase information on the radio signal. The reader/writer device 102 provides the acquired tag ID, the acquired amplitude information, and the acquired phase information to the controlling circuitry 101.

The controlling circuitry 101 calculates a position (or positional range) where the RFID tag having the acquired tag ID exists, based on a shape of the radiation pattern of the null formed based on the phase shift voltage. In other words, it is found from the value of the phase shift voltage that the null is formed in which direction around which axis (first axis or second axis described above) as a rotation axis. When the null is directed to the RFID tag (beam is not directed to RFID tag), readout from the RFID tag is not performed. When the null is not directed to the RFID tag (beam is directed to RFID tag), readout from the RFID tag is performed. Accordingly, specifying a range of the phase shift voltage when the readout from the RFID tag is not performed, namely, a range of the direction of the null when the readout from the RFID tag is not performed makes it possible to specify presence of the RFID tag in the range of the direction of the null at that time.

Figure 18:
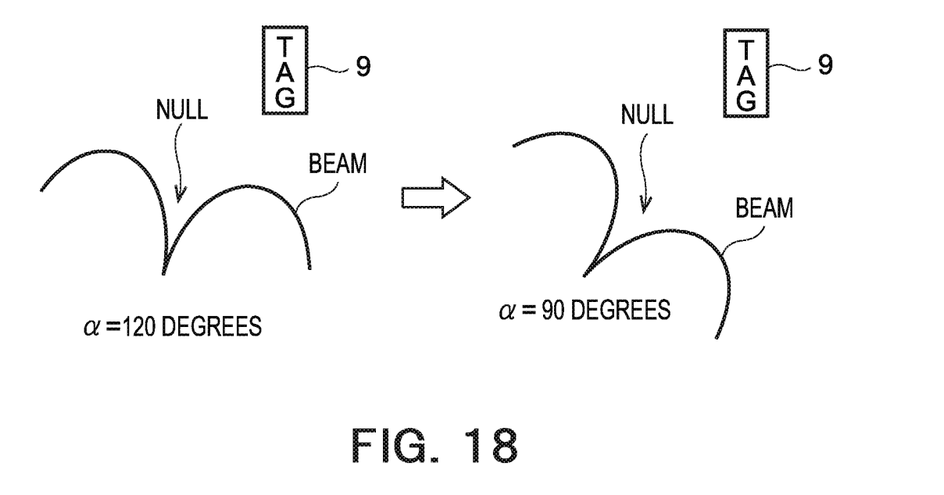
FIG. 18 is an image diagram of search.

FIG. 18 illustrates a specific example of an image of the search. The search is started at the phase "α" of 180 degrees, and the phase "α" is reduced up to 30 degrees in a stepwise manner. An RFID tag 9 is detected at the phase "α" of 180 degrees, whereas the RFID tag 9 starts not to be detected from the phase "α" of 120 degrees. At this time, the null of the antenna apparatus is directed to the RFID tag 9. Thereafter, the RFID tag 9 is not detected until the phase "α" becomes 60 degrees, and when the phase "α" becomes less than 60 degrees, the RFID tag 9 starts to be detected again. Accordingly, it can be estimated that the position of the RFID tag 9 is within a range of the phase "α" from 120 degrees to 60 degrees. In other words, the position of the RFID tag 9 can be specified between the direction of the null corresponding to the phase "α" of 120 degrees and the direction of the null corresponding to the phase "α" of 60 degrees. Further, a distance from the antenna apparatus can be estimated by using the amplitude information and the phase information on the radio signal received from the RFID tag 9. The position of the RFID tag can be specified in a narrower range by using the estimated distance. For example, it can be estimated that the RFID tag exists at a position at the estimated distance within the specified range of the direction of the null.

The case where the null is scanned on one axis is described. In a case where the null is scanned on two axes, the scanning is performed for each axis, which makes it possible to specify the range of the RFID tag in a narrower range. More specifically, the null is scanned on two axes to specify, for each of the two axes, the range of the direction of the null where the RFID tag exists, and it is determined that the RFID tag is located at an overlapped portion of both ranges. Alternatively, the null is scanned on two axes to specify the range of the direction of the null where the RFID tag exists, and the distance from the antenna apparatus is estimated. The range where the RFID tag exists is specified for each of the two axes from the range of the direction of the null and the estimated distance. It can be determined that the RFID tag is located at an overlapped portion of the specified ranges.

In the present embodiment, the search apparatus using the RFID is described; however, the search apparatus may use other radio system such as Bluetooth® low energy (BLE).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An antenna apparatus, comprising:
   at least four first to Nth (N≥4) circularly polarized antennas arranged in a planar shape; and
   phase adjustment circuitry configured to adjust phase relationship between first to Nth signals to be transmitted from the first to Nth circularly polarized antennas or between first to Nth signals received by the first to Nth circularly polarized antennas, wherein
   the first to Mth (M=N/2) circularly polarized antennas and the M+1th to Nth circularly polarized antennas are arranged at positions surface-symmetrical to each other,
   the first to Nth circularly polarized antennas are rotated in direction at first to Nth angles with respect to a first direction parallel to the first to Nth circularly polarized antennas, and
   the phase adjustment circuitry is configured to set phases of the first to Mth signals to first to Mth phases corresponding to the first to Mth angles, and set phases of the M+1th to Nth signals to M+1th to Nth phases added by a first value to phases corresponding to the M+1th to Nth angles.

2. The antenna apparatus according to claim 1, further comprising distributing/combining circuitry configured to divide an input signal into the first to Nth signals and to supply the first to Nth signals to the phase adjustment circuitry, or configured to combine the first to Nth signals adjusted in phase by the phase adjustment circuitry.

3. The antenna apparatus according to claim 1, wherein the first value is selected from a range of 90 degrees or more and 270 degrees or less, a range of 45 degrees or more and 315 degrees or less, or a range of 30 degrees or more and 330 degrees or less.

4. The antenna apparatus according to claim 1, wherein the phase adjustment circuitry includes at least one phase shifter connected to at least one of the first to Nth circularly polarized antennas.

5. The antenna apparatus according to claim 4, wherein the phase shifter is a variable phase shifter.

6. An antenna apparatus, comprising:
   first to fourth circularly polarized antennas arranged in a planar shape; and
   distributing/combining circuitry configured to divide an input signal into first to fourth signals and to supply the first to fourth signals to the first to fourth circularly polarized antennas, or configured to combine first to fourth signals received by the first to fourth circularly polarized antennas, wherein
   the first and second circularly polarized antennas are arranged at positions surface-symmetrical to positions of the third and fourth circularly polarized antennas,
   the first to fourth circularly polarized antennas are rotated in direction at first to fourth angles with respect to a first direction parallel to the first to fourth circularly polarized antennas,
   a phase of the first signal is a first phase corresponding to the first angle,
   a phase of the second signal is a second phase corresponding to the second angle,
   a phase of the third signal is a third phase added by a first value to a phase corresponding to the third angle, and
   a phase of the fourth signal is a fourth phase added by the first value to a phase corresponding the fourth angle.

7. The antenna apparatus according to claim 6, further comprising phase adjustment circuitry configured to adjust phase relationship between the first to fourth signals.

8. The antenna apparatus according to claim 7, wherein the phase adjustment circuitry includes at least one phase shifter connected to at least any of the first to fourth circularly polarized antennas.

9. The antenna apparatus according to claim 8, wherein the phase shifter is a variable phase shifter.

10. The antenna apparatus according to claim 6, wherein the first value is a value at which a first radiation null is formed in a plane including at least a part of an intersection line of a first plane and a second plane,
    the first plane being a plane parallel to the first to fourth circularly polarized antennas, and
    the second plane being a plane of symmetry that the positions of the first and second circularly polarized antennas are symmetrical to the positions of the third and fourth circularly polarized antennas.

11. The antenna apparatus according to claim 10, wherein the first null is scanned by changing the first value.

12. The antenna apparatus according to claim 10, wherein
the first and third circularly polarized antennas are arranged at the positions surface-symmetrical to the positions of the second and fourth circularly polarized antennas,
the phase of the first signal is a fifth phase corresponding to the first angle,
the phase of the third signal is a sixth phase corresponding to the third angle,
the phase of the second signal is a sixth phase added by a second value to the phase corresponding to the second angle, and
the phase of the fourth signal is a seventh phase added by the second value to the phase corresponding to the fourth angle.

13. The antenna apparatus according to claim 12, wherein the second value is a value at which a second radiation null is formed in a plane including at least a part of an intersection line of the first plane and a third plane,
the third plane being a plane of symmetry that the positions of the first and third circularly polarized antennas are symmetrical to the positions of the second and fourth circularly polarized antennas.

14. The antenna apparatus according to claim 13, wherein the first null is scanned by changing the first value, and the second null is scanned by changing the second value.

15. The antenna apparatus according to claim 6, wherein the first value is selected from a range of 90 degrees or more and 270 degrees or less, a range of 45 degrees or more and 315 degrees or less, or a range of 30 degrees or more and 330 degrees or less.

16. An electronic apparatus, comprising:
the antenna apparatus according to claim 6; and
control circuitry configured to estimate a position or a range where a transmission source of a radio signal received by the antenna apparatus exists, based on the radio signal and a direction of a radiation null formed by the antenna apparatus.

* * * * *